2 Sheets—Sheet 1.
R. H. JONES.
FIREMAN'S EXTENSION LADDER.
No. 79,763.        Patented July 7, 1868.
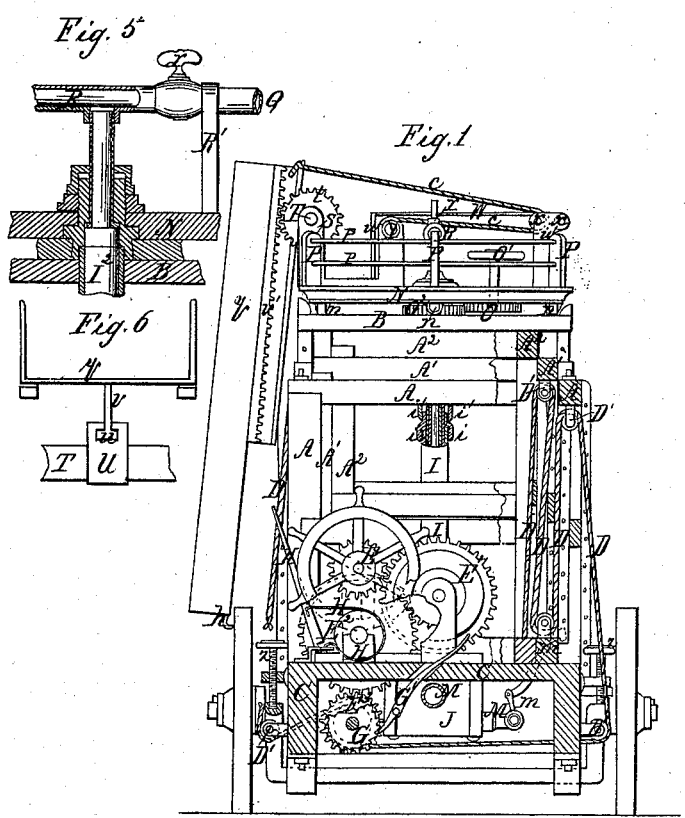
Witnesses
Inventor 2 Sheets—Sheet 2.
R. H. JONES.
FIREMAN'S EXTENSION LADDER.
No. 79,763. Patented July 7, 1868.
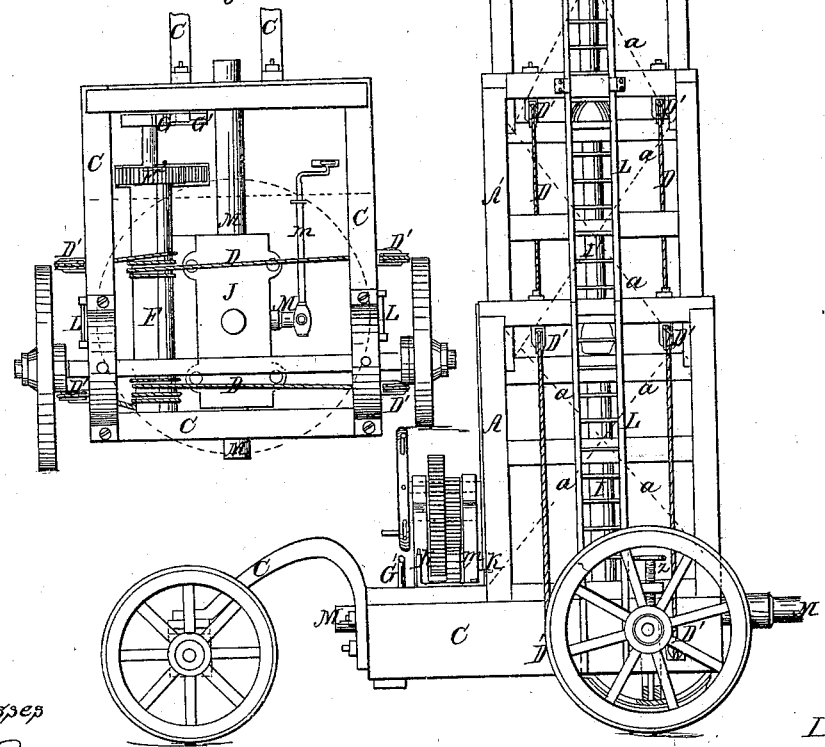

United States Patent Office.

ROBERT H. JONES, OF SAN FRANCISCO, CALIFORNIA.

Letters Patent No. 79,763, dated July 7, 1868.

---

IMPROVED FIREMAN'S EXTENSION-LADDER.

---

The Schedule referred to in these Letters Patent and making part of the same.

---

TO ALL WHOM IT MAY CONCERN:

Be it known that I, ROBERT H. JONES, of the city and county of San Francisco, and State of California, have invented a new and improved Fireman's Extension-Ladder; and I do hereby declare the following to be a full, clear, and exact description of the same, sufficient to enable those skilled in the art to which my invention appertains to make use of it, reference being had to accompanying drawings, forming part of this specification, in which—

Figure 1 is a side elevation, when the frames are not expanded, showing the lower part in section.
Figure 2 is a side elevation, showing the frames expanded.
Figure 3 is a bottom view.
Figure 4 is a section through the reservoir.
Figure 5 is a section of the platforms and water-pipes above them.
Figure 6 is a cross-section of the sliding bridge.

This invention is an apparatus, by which, in cases of fires in lofty buildings, the hose can be carried to the top of the building, and there operated conveniently and safely from the ladder. A device is connected, by which persons and valuable property can at the same time be removed from the upper stories of the building.

The elevating-apparatus, which forms one of the main features of my invention, consists of a series of vertical frames, A $A^1$ $A^3$, &c., one sliding within the other, supporting a round platform, B, at the top, and being themselves supported upon a carriage, C, at the bottom.

The frames A $A^2$, &c., are strengthened by braces $a$ $a$, and elevated by means of ropes D D and pulleys D' D', arranged and operating as shown clearly in fig. 1.

E $E^1$ $E^2$ $E^3$ is a powerful arrangement of gear-wheels, operating the roller F, by which the frames are raised and lowered, as represented in fig. 3.

H is a brake, for regulating the speed of the frames while they are ascending and descending, and G G' are a ratchet and pawl, by which the frames can be permanently held at any desired elevation.

K is a stop, by which the motion of the frame $A^1$ can be arrested, and only the upper frames be allowed to move.

Each frame is provided with a section of ladder, L, by which, when the frames are expanded, communication is had from the platform to the ground, as seen in fig. 2.

At the centre of the sliding frames is a series of vertical metallic water-pipes, I $I^1$ $I^2$, &c., corresponding in length to the frames, and arranged to slide one within another, in the manner of a telescopic tube.

The inner or upper section of tube $I^2$ is attached to the inner or upper frame $A^2$, and the outer or lower section I to the outer or lower frame A, so that the expansion or contraction of the frames expands or contracts the length of the tubes. At their joints the sections of tube are packed, as shown at $i$ $i'$ in fig. 1.

The tube I is connected with a reservoir, J, within the body of the carriage, which may be supplied from several different hydrants or fire-engines by means of pipes or hose M M, extending in different directions.

$m$ $m$ are valves, for opening and closing the pipes M, operated from the floor of the carriage by levers.

$m'$ $m'$ are check-valves, to prevent the water within the reservoir from being forced back through the supply-pipes.

Upon the platform B travels a second circular platform, N, running upon rollers $n$ $n$. It is rotated upon its vertical axis by means of a cog-wheel, $o$, attached to a hand-wheel shaft, $o^1$, and gearing into a circular wheel or disk, $o^2$, fixed to the centre of the platform B. By turning the hand-wheel, any point in periphery of the platform N may be brought in front of a window in the burning building, and the working of the hose and the escape of the occupants of the house may often be greatly facilitated thereby. This platform is provided with a guard, P, constructed with posts and metallic rods, by which the firemen can easily and safely pass from the platform to the ladder L, or from the ladder to the platform, in whatever position the latter may be.

The upper section of the water-pipe $I^2$ extends through the platform, rising three or four feet above it, and terminating in a short cross-pipe, R, fixed to posts R' R'. To the ends of the cross-pipe R, the hose Q is attached.

Stop-cocks *r r* are provided, by which to arrest or regulate the flow of water through the hose.

At one side of the platform N, two stout posts S S are fixed, bearing a shaft, T, which carries a stout cog-wheel, *t*, at each end inside of the posts. The shaft is worked by a hand-wheel, T', and is prevented from reacting by means of a ratchet and pawl, *t'*.

A stout block, U, rides upon the shaft T, midway between the posts S S, in the uppper edge of which is a deep groove, *u*, the cross-section of which is in the shape of an inverted T, as shown clearly in fig. 6.

A draw-bridge, V, of the form and dimensions represented in the drawings, made of iron to prevent its burning, is mounted upon the block U, and slides in and out upon it.

A guide-rail, *v*, is fixed to the bridge under its centre, extending about two-thirds of its length. The guide-rail is of the shape of an inverted T railroad-rail, and fits in the groove *u*, so as to slide back and forth easily in it.

The draw-bridge is provided on its under side with racks *v' v'*, into which the wheels *t t* gear, and by which they move the bridge back and forth. It is also provided at its outer extremity with hooks *h h*, by which it can be fixed to the building during the operations of the firemen.

The rear end of the bridge slides back and forth upon a level guide-beam, W, supported upon posts *w w'*, fixed to the platform. A cord or chain, *c*, passes from the rear end of the bridge over pulleys *x-x* in the post *w'*, and back to a roller, Y, upon which it is wound. The roller is operated by a hand-wheel, and provided with a pawl and ratchet.

The object of the bridge is to afford means for entering the building from the fire-ladder, and for removing articles from the building. It can be run out from the platform at pleasure by the hand-wheel T', and elevated or depressed to any degree within the limits shown by its position in figs. 1 and 2, by means of the hand-wheel Y, operating the cord *c*. It can be directed to any quarter of the horizon by the hand-wheel *o'*, and can be adjusted at any height by raising or depressing the frames A $A^1$ $A^2$, as above explained.

The carriage can be adjusted in a level position upon inclined ground by means of the screws *z z*, which raise or depress its sides, acting upon the axle in the manner shown in figs. 1 and 2.

A bell, *z*, is attached to the upper side of the platform N, by which the operators on the platform can signal to those below when they want the platform raised or lowered, or the water let on or shut off.

Having thus described my invention, what I claim as new, and desire to secure by Letters Patent, is—

1. The combination, in a fireman's extension-ladder, of the sliding frames A $A^1$ $A^2$, with the sliding telescopic tube I $I^1$ $I^2$, substantially as above described.

2. In combination with the extension-tube I $I^1$ $I^2$, the reservoir J, provided with several supply-pipes M M M, substantially as and for the purposes specified.

3. The rotating platform N, when used in connection with a fireman's extension-ladder, substantially as and for the purposes described.

4. The sliding bridge V, operated by the wheels T Y, when used in combination with a revolving platform N, substantially as and for the purpose specified.

5. The combination of the carriage C, with the screws *z z*, by which it is adjusted to a level when standing upon inclined ground, substantially in the manner described.

ROBERT H. JONES.

Witnesses:
   CHAS. A. PETTIT,
   SOLON C. KEMON.